United States Patent [19]

Turner

[11] 3,900,489

[45] Aug. 19, 1975

[54] PREPARATION OF 1,1'-PEROXYDICYCLOHEXYLAMINE

[75] Inventor: John O. Turner, West Chester, Pa.

[73] Assignee: Sun Research and Development Co., Philadelphia, Pa.

[22] Filed: Jan. 2, 1973

[21] Appl. No.: 320,225

[52] U.S. Cl. .............................................. 260/307 F
[51] Int. Cl.$^2$ ...................................... C07D 273/00
[58] Field of Search ............................... 260/307 FB

[56] References Cited
FOREIGN PATENTS OR APPLICATIONS
2,064,077  7/1971  Germany

OTHER PUBLICATIONS

Hawkins – J. Chem. Soc. (C) 1969, 2678–2681.
Hawkins – J. Chem. Soc. (C) 1969, 2682–2686.

*Primary Examiner*—Raymond V. Rush
*Attorney, Agent, or Firm*—George L. Church; Donald R. Johnson; Stanford M. Back

[57] ABSTRACT

The caprolactam intermediate, 1,1'-peroxydicyclohexylamine, can be prepared by reacting cyclohexanone, with an aliphatic or alicyclic hydroperoxide and ammonia. In addition to the hexylamine intermediate, there is also formed as a by-product t-butyl alcohol.

6 Claims, No Drawings

PREPARATION OF 1,1′-PEROXYDICYCLOHEXYLAMINE

BACKGROUND OF THE INVENTION

This invention relates to a process for the preparation of a caprolactam intermediate. More particularly, this invention relates to an improved process for the production of 1,1′-peroxydicyclohexylamine (hereafter "hexylamine") by reacting together cyclohexanone, an aliphatic or alicyclic hydroperoxide, and ammonia.

Hawkins et al, J. Chem. Soc., 2663 (1969) teach the preparation of the hexylamine intermediate, using cyclohexanone, hydrogen peroxide, and ammonia. This method, while effective, is characterized by the use of the expensive reagent, hydrogen peroxide, which is difficult to handle in large amounts.

Hawkins et al, U.S. Pat. No. 3,575,964 also teach the conversion of the hexylamine compound to caprolactam and cyclohexanone by heating the hexylamine with lithium chloride or a strong base at about 100°C.

Finally, Hawkins et al., J. Chem, Soc., 2682 (1969) report the reaction of cyclohexanone, t-butylhydroperoxide, and ammonia to yield t-butylperoxycyclohexylamine rather than the 1,1′-peroxydicyclohexylamine described hereinbelow. Notwithstanding this Hawkins work, as will be shown in the examples below, when this reaction was reproduced, surprisingly the 1,1′-peroxydicyclohexylamine was obtained rather than the Hawkins' t-butylperoxycyclohexylamine, which was not observed. Unlike the dicyclohexylamine, the t-butylperoxy compound is of no value as a caprolactam intermediate.

SUMMARY OF THE INVENTION

Thus, the present process provides a process for the preparation of 1,1′-peroxydicyclohexylamine by contacting cyclohexanone with an aliphatic or alicyclic hydroperoxide and ammonia in the presence of an accelerator for the reaction, such as $NH_4NO_3$, in accordance with the following reaction scheme:

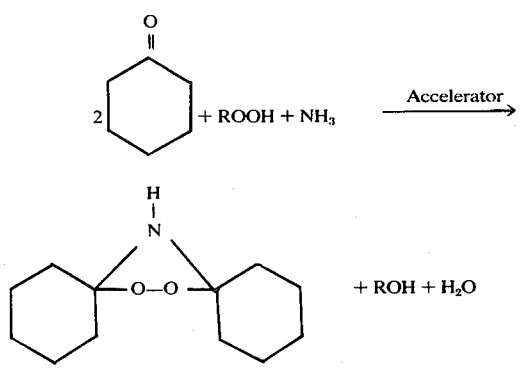

where R is an aliphatic or alicyclic hydrocarbon moiety.

DESCRIPTION OF THE INVENTION

The hydroperoxide reactant is any primary, secondary or tertiary aliphatic or alicyclic hydroperoxide, preferably an alkyl or cycloalkyl hydroperoxide, having from 3 to 12 carbon atoms. Included amongst these are such compounds as n-butylhydroperoxide, t-butylhydroperoxide, 2-pentylhydroperoxide, t-pentylhydroperoxide, isooctylhydroperoxide, cyclopentylhydroperoxide, 1-methylcyclopentylhydroperoxide, cyclohexylhydroperoxide, 1-methylcyclohexylhydroperoxide, and the like. Of these, cyclohexylhydroperoxide is preferred inasmuch as the corresponding cyclohexyl alcohol formed as a by-product from this hydroperoxide may readily be oxidized to the corresponding cyclohexanone and recycled to the reaction medium.

The reaction is conveniently conducted by contacting a mixture of the cyclohexanone and desired hydroperoxide dissolved in a suitable organic solvent with a molar excess of ammonia which is added to the reaction mixture as a liquid at low temperatures. The reaction is desirably carried out at a temperature of from about −10° to 50°C, and preferably from about 0° to 20°C for about 6 to 12 hours. It is preferred, although not essential, that an accelerator for the reaction be employed, i.e. a compound such as $NH_4NO_3$, or the like in amounts of about 1 to 12 grams per 35 grams of cyclohexanone. If desired, small amounts of a stabilizer for the hydroperoxide such as the sodium salt of ethylenediaminetetraacetic acid, or the like may be employed, although this is not essential. The organic solvents which may be used include $C_2$–$C_6$ alcohols, i.e. alkanols such as ethyl or propyl alcohol, and the like.

The mole ratio of hydroperoxide to cyclohexanone should desirably be maintained at stoichiometric quantities, i.e. at a ratio of about 0.5:1.0, while the mole ratio of ammonia to cyclohexanone should be in the range of about 0.5 to 10.0:1.0, and preferably at least 2:1 in order to maintain an excess of ammonia.

The hexylamine product is readily recovered by conventional means known in the art, as for example by distillation or ether extraction, or combinations thereof.

The process of this invention will now be illustrated by the following examples.

EXAMPLE 1

Into a flask is added 35.0 gms. of cyclohexanone, 50.0 gms. of t-butylhydroperoxide, 50 cc of ethyl alcohol, 0.5 gms. of ethylenediaminetetraacetic acid.-disodium salt, 10.0 gms. of $NH_4NO_3$, and 60.0 gms. of $NH_3$. The reaction is stirred at 0° for 18 hours. When the reaction is complete the mixture is extracted with ether. The ether extract is then worked up by distillation and yields, along with some unreacted starting materials, 1,1′-peroxydicyclohexylamine and t-butyl alcohol.

EXAMPLE 2

In accordance with the procedures of Example 1, 35.0 gms. of cyclohexanone, 50.0 gms. of 70 percent t-butylhydroperoxide, 70.0 gms. of $NH_3$ in 50 cc of ethanol is reacted at 0°C for 18 hours. No stabilizer or accelerator is employed. The product is worked up as in Example 1 and yields the hexylamine and t-butyl alcohol.

EXAMPLE 3

The process of Example 1 is repeated, except that cyclohexylhydroperoxide is substituted for t-butylhydroperoxide. The product again is 1,1′-peroxydicyclohexylamine, together with some cyclohexyl alcohol.

What is claimed is:

1. A process for the production and recovery of 1,1'-peroxydicyclohexylamine and an aliphatic or alicyclic alcohol, which comprises reacting at a temperature of from −10°C to 50°C cyclohexanone and ammonia with a hydroperoxide of the formula ROOH, wherein R is a primary, secondary, or tertiary alkyl or cycloalkyl hydrocarbon group having from 3 to 12 carbon atoms, and recovering from the reaction mixture said 1,1'-peroxydicyclohexylamine and an alcohol of the formula ROH, wherein R is defined as above, and wherein the mole ratio of hydroperoxide to cyclohexanone is about 0.5:1.0.

2. The process according to claim 1 wherein $NH_4NO_3$ compound is used as a reaction accelerator.

3. The process according to claim 1 wherein the reaction is carried out in the presence of a suitable organic solvent.

4. The process according to claim 1 wherein the hydroperoxide is cyclohexylhydroperoxide and the alcohol recovered is cyclohexyl alcohol.

5. The process according to claim 1 wherein the hydroperoxide is t-butylhydroperoxide and the alcohol recovered is t-butyl alcohol.

6. The process according to claim 1 wherein the mole ratio of ammonia to cyclohexanone is about 0.5 to 10.0:1.0.

\* \* \* \* \*